(12) United States Patent
Birch et al.

(10) Patent No.: US 10,946,972 B2
(45) Date of Patent: Mar. 16, 2021

(54) METHOD AND SYSTEM FOR CONTROLLING THRUST OF AN ENGINE

(71) Applicant: PRATT & WHITNEY CANADA CORP., Longueuil (CA)

(72) Inventors: Glenn Birch, Mississauga (CA); Faran Hafeez, Mississauga (CA); Regina Parker, LaSalle (CA); Jason Tremblay, Montréal (CA); Paul Fisher, North Palm Beach, FL (US); Michael Krynski, Waterdown (CA); Eric Brossard, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 27 days.

(21) Appl. No.: 16/198,721

(22) Filed: Nov. 21, 2018

(65) Prior Publication Data

US 2019/0176996 A1    Jun. 13, 2019

Related U.S. Application Data

(60) Provisional application No. 62/596,427, filed on Dec. 8, 2017.

(51) Int. Cl.
*B64D 31/00* (2006.01)
(52) U.S. Cl.
CPC .................................. *B64D 31/00* (2013.01)
(58) Field of Classification Search
CPC ................................................... B64D 31/00
USPC ....................................................... 701/100
See application file for complete search history.

(56) References Cited

U.S. PATENT DOCUMENTS

| | | | |
|---|---|---|---|
| 4,641,268 A | 2/1987 | Zweifel et al. | |
| 5,394,689 A | 3/1995 | D'Onofrio | |
| 7,949,440 B2 | 5/2011 | Ramos et al. | |
| 9,932,120 B2* | 4/2018 | Fisher | F04D 29/362 |
| 2002/0131864 A1* | 9/2002 | Vos | F02C 9/48 416/25 |
| 2004/0102890 A1* | 5/2004 | Brunell | G05B 13/048 701/100 |
| 2007/0125905 A1* | 6/2007 | Fukuda | F02C 9/00 244/23 A |
| 2011/0046863 A1* | 2/2011 | Tezuka | F02C 9/46 701/100 |
| 2012/0174559 A1* | 7/2012 | Ling | F02K 1/16 60/204 |

(Continued)

FOREIGN PATENT DOCUMENTS

CA          3002287 A1 * 11/2018 ................ F02C 9/28

*Primary Examiner* — Atul Trivedi
(74) *Attorney, Agent, or Firm* — Norton Rose Fulbright Canada LLP

(57) ABSTRACT

Systems and methods for controlling thrust of an engine for an aircraft are described herein. A position of a thrust lever for controlling the engine is obtained from one or more sensors. Air data is obtained from one or more air data inputs. An air temperature data input is detected as compromised from the air data. In response to detecting the air temperature data input is compromised, a target engine rotational speed is determined based on the position of the thrust lever and at least one of altitude data and Mach number data from the air data. A rotational speed of the engine is adjusted to the target engine rotational speed to control thrust of the engine.

20 Claims, 6 Drawing Sheets

(56) References Cited

U.S. PATENT DOCUMENTS

| | | | | |
|---|---|---|---|---|
| 2015/0128597 A1* | 5/2015 | Schlak | ............... | F03D 9/00 |
| | | | | 60/719 |
| 2017/0068252 A1* | 3/2017 | Yu | ............... | B64C 15/00 |
| 2018/0155011 A1* | 6/2018 | Greiner | ............... | B64D 1/22 |
| 2019/0023385 A1* | 1/2019 | Nguyen | ............... | G05D 1/042 |
| 2019/0071172 A1* | 3/2019 | Caldwell | ............... | B64D 35/00 |
| 2019/0127076 A1* | 5/2019 | Hodges | ............... | B64D 31/10 |
| 2019/0202546 A1* | 7/2019 | Mahboubi | ............... | B64C 27/28 |
| 2019/0248482 A1* | 8/2019 | Gillett | ............... | B64C 27/006 |
| 2019/0322380 A1* | 10/2019 | Roberts | ............... | G05D 1/0607 |

* cited by examiner

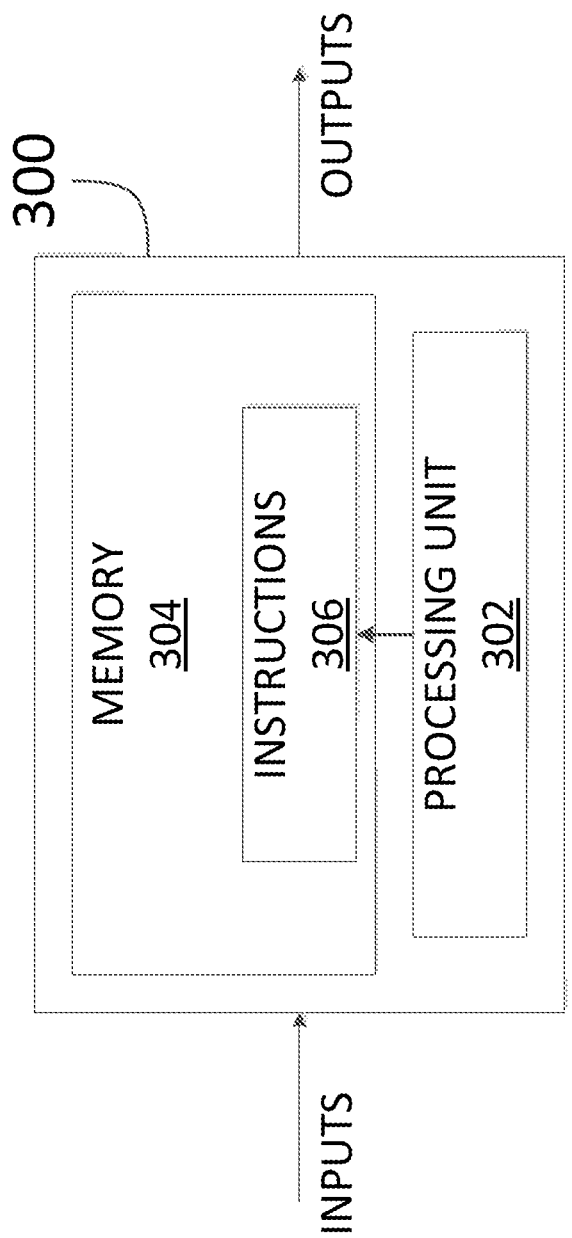

METHOD AND SYSTEM FOR CONTROLLING THRUST OF AN ENGINE

CROSS-REFERENCE TO RELATED APPLICATIONS

The present application claims priority under 35 U.S.C. 119(e) of Provisional Patent Application Ser. No. 62/596,427 filed on Dec. 8, 2017, the contents of which are hereby incorporated by reference.

TECHNICAL FIELD

The present disclosure relates generally to engine control, and, more particularly, to controlling thrust of an engine for an aircraft.

BACKGROUND OF THE ART

For engines used in the propulsion of aircraft, a thrust lever in a cockpit of an aircraft is typically used for adjusting the thrust of the engine. During normal operation of the engine, a thrust rating is selected using air data from the airframe of the aircraft and bleed data. Then, the thrust of the engine is controlled based on the selected thrust rating and the position of the thrust lever.

However, when the air data is unreliable, a thrust rating cannot be selected and the thrust of the engine cannot be controlled according to an appropriately selected thrust rating.

Thus, there is a need for controlling thrust of an engine when air data is unreliable.

SUMMARY

In one aspect, there is provided a method of controlling thrust of an engine for an aircraft, the method comprising: obtaining, at the computing device, a position of a thrust lever for controlling the engine from one or more sensors; obtaining, at the computing device, air data from one or more air data inputs; detecting from the air data if an air temperature data input is compromised; in response to detecting that the air temperature data input is compromised, determining, at the computing device, a target engine rotational speed based on the position of the thrust lever and at least one of altitude data and Mach number data obtained from the air data; and adjusting, by the computing device, a rotational speed of the engine to the target engine rotational speed to control thrust of the engine.

In another aspect, there is provided a system for controlling thrust of an engine for an aircraft, the system comprising: at least one processing unit; and a non-transitory computer-readable memory having stored thereon program instructions executable by the at least one processing unit for: obtaining a position of a thrust lever for controlling the engine from one or more sensors; obtaining air data from one or more air data inputs; detecting from the air data if an air temperature data input is compromised; in response to detecting that the air temperature data input is compromised, determining a target engine rotational speed based on the position of the thrust lever and at least one of altitude data and Mach number data obtained from the air data; and adjusting a rotational speed of the engine to the target engine rotational speed to control thrust of the engine.

In another aspect, there is provided a computer readable medium having stored thereon program code executable by a processor for controlling thrust of an engine for an aircraft, the program code comprising instructions for: obtaining a position of a thrust lever for controlling the engine from one or more sensors; obtaining air data from one or more air data inputs; detecting from the air data if an air temperature data input is compromised; in response to detecting that the air temperature data input is compromised, determining a target engine rotational speed based on the position of the thrust lever and at least one of altitude data and Mach number data obtained from the air data; and adjusting a rotational speed of the engine to the target engine rotational speed to control thrust of the engine.

DESCRIPTION OF THE DRAWINGS

Reference is now made to the accompanying figures in which:

FIG. 3 is a block diagram of an example computing system for implementing the method of FIGS. 2A and 2B in accordance with an embodiment;

It will be noted that throughout the appended drawings, like features are identified by like reference numerals.

DETAILED DESCRIPTION

There is described herein methods and systems for controlling thrust of an engine for an aircraft. The method and system for controlling thrust described herein may be used to provide an alternate thrust control (ATC) mode for controlling thrust of an engine when there is a compromised air data input.

Figure 1:
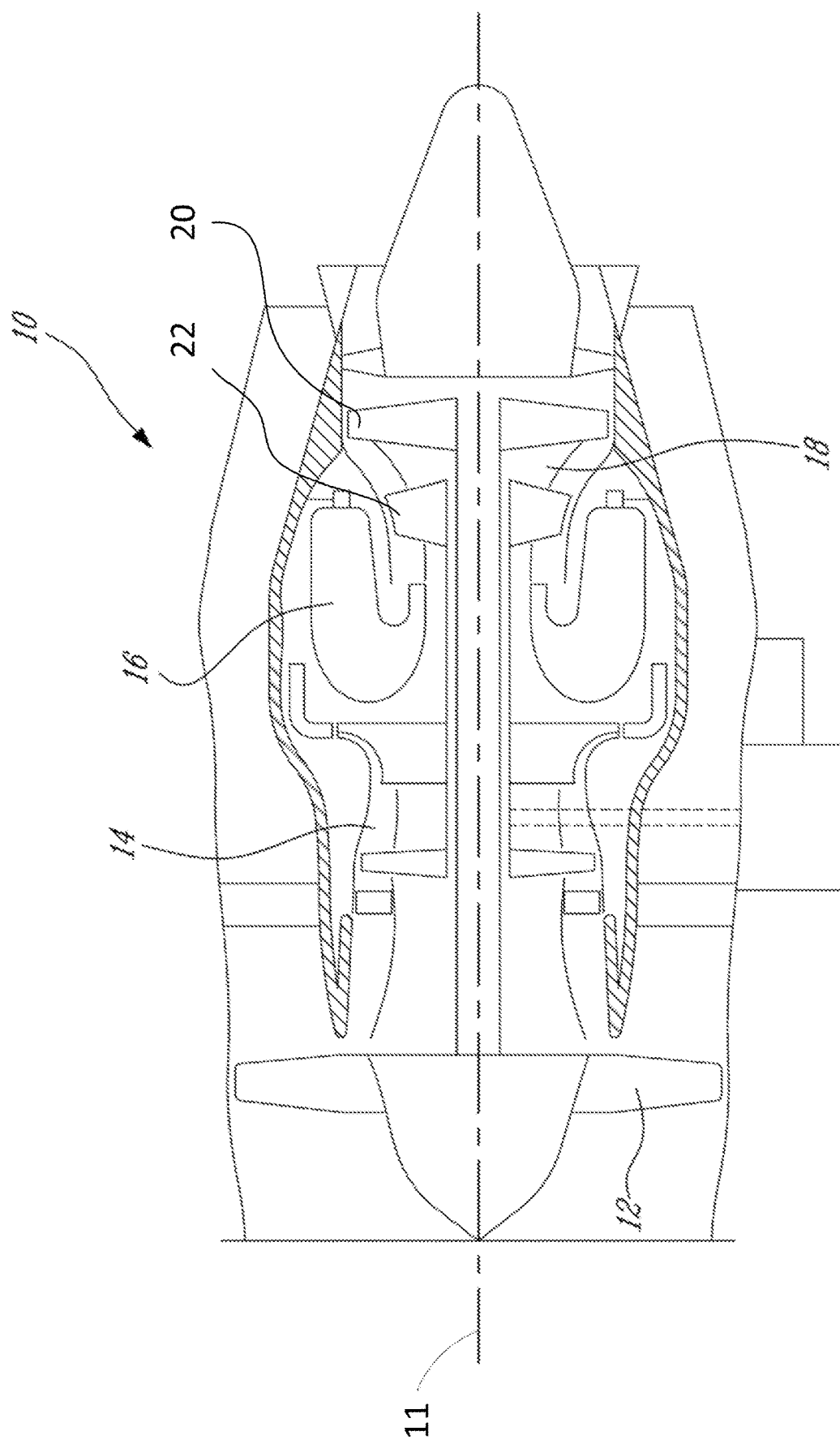
FIG. 1 is a schematic cross-sectional view of an example engine of an aircraft.

FIG. 1 illustrates a gas turbine engine 10 to which the methods and systems described herein may be applied. Note that while engine 10 is a turbofan engine, the methods and systems described herein may be applicable to turboprop, turboshaft, and other types of gas turbine engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10. In some embodiments, a low pressure spool is composed of a low pressure shaft and a low pressure turbine 20. The low pressure shaft drives the fan 12. A high pressure spool is composed of a high pressure turbine 22 attached to a high pressure shaft, which is connected to the compressor section 14.

Figure 2A:
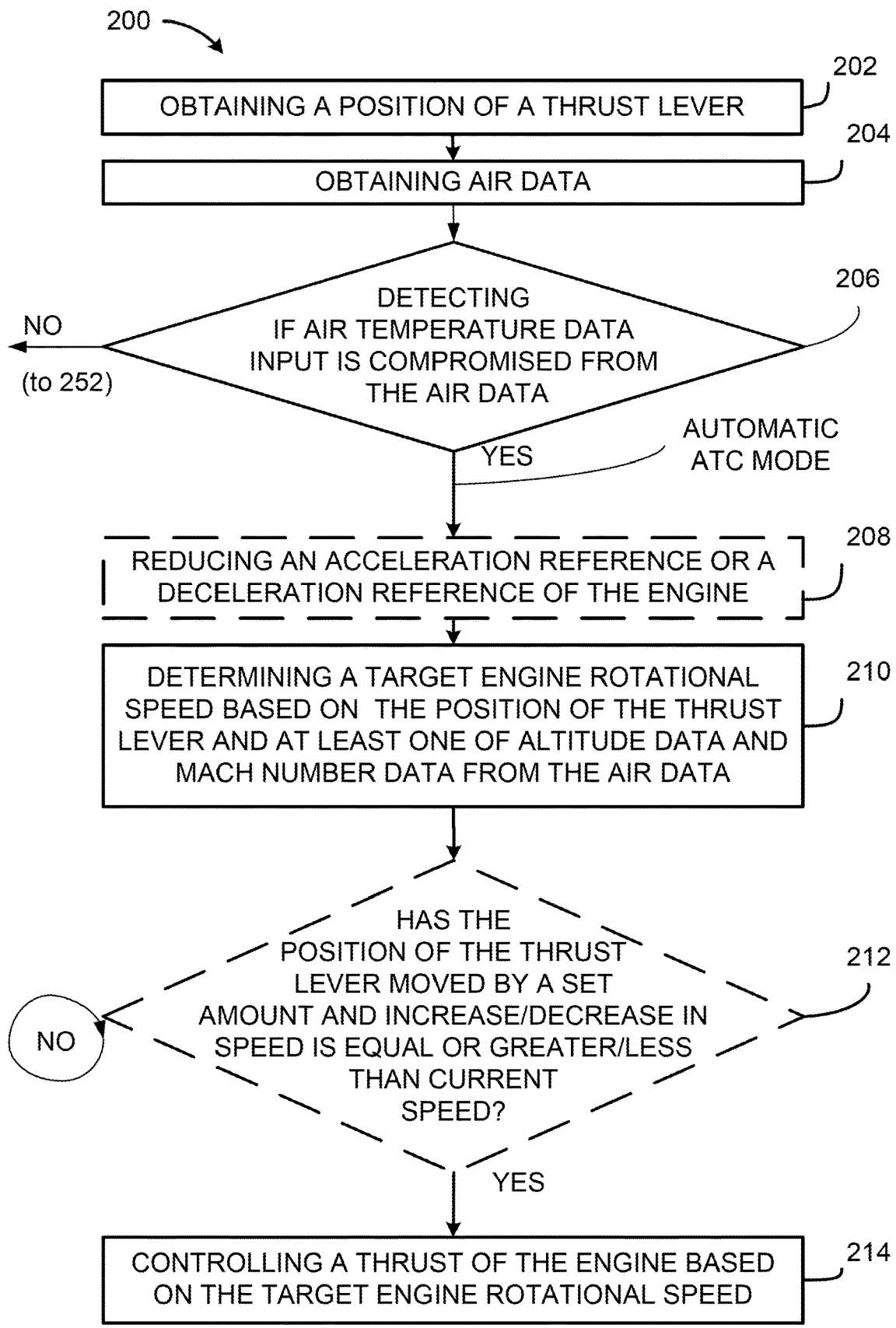
FIG. 2A is a flowchart illustrating an example method for controlling thrust of an engine in accordance with an embodiment.

With reference to FIG. 2A, there is shown a flowchart illustrating an example method 200 for controlling thrust of an aircraft engine, such as the engine 10 of FIG. 1. While the method 200 is described herein with reference to the engine 10 of FIG. 1, this is for example purposes. The method 200 may be applied to other types of engines depending on practical implementations.

At step 202, a position of a thrust lever is obtained. The thrust lever may comprise any suitable mechanism for controlling thrust of the engine 10. The position of the thrust lever may be defined by an angle, such as a thrust lever angle (TLA). The position of the thrust lever may be determined using position sensors or other position determining mechanisms. The position of the thrust lever used for controlling the engine 10 is obtained either dynamically in real time, regularly in accordance with any predetermined time interval, or any irregular time interval. The position of the thrust lever may be actively retrieved, or may be passively received. For example, the position of the thrust lever may be retrieved and/or received from a measuring device comprising one or more sensors for measuring the position of the thrust lever. By way of another example, the position of the thrust lever may be retrieved and/or received from a control system or aircraft/engine computer. In some embodiments, the position of the thrust lever may be provided to the control system or aircraft/engine computer from the measuring device. In other words, the position of the thrust lever may be obtained from one or more sensors via a computing device (e.g., the control system or aircraft/engine computer) or directly from the measuring device. In some embodiments, the position of the thrust lever is obtained via existing components as part of engine control and/or operation. In some embodiments, step 202 comprises triggering measurement of the position of the thrust lever whenever method 200 is initiated.

At step 204, air data is obtained from one or more air data inputs. The air data may comprise one or more of air temperature data, pressure data, altitude data, airspeed data, Mach data and/or any other suitable data associated with the aircraft. The air temperature data may comprise data regarding total air temperature (TAT), which refers to the temperature of an airflow measured as the airflow is brought to rest. The air temperature data may comprise data regarding outside air temperature (OAT), which refers to the temperature of the static outside temperature without the effects of airspeed. The pressure data may comprise data regarding static pressure (Ps), which refers to the atmospheric pressure at the flight level of the aircraft. The pressure data may comprise data regarding impact pressure (Qc), which refers to the pressure created by the forward motion of the aircraft. The pressure data may comprise data regarding total pressure (Pt), which refers to the sum of local atmospheric pressure and dynamic pressure, or in other words the sum of the static pressure and the impact pressure. The air speed data may comprise data regarding indicated air speed (IAS), which refers to the indicated air speed displayed. The air speed data may comprise data regarding true airspeed (TAS), which refers to the relative velocity between the aircraft and the surrounding air mass. The air speed data may comprise data regarding calibrated airspeed (CAS), which refers to the IAS corrected for instrument and/or position error. The altitude data may comprise data regarding indicated altitude, which refers to the altitude shown on the altimeter. The altitude data may comprise data regarding absolute altitude, which refers to altitude in terms of the distance above the ground. The altitude data may comprise data regarding true altitude, which refers to altitude in terms of elevation above sea level. The altitude data may comprise data regarding height, which refers to altitude in terms of the distance above a certain point. The altitude data may comprise data regarding pressure altitude, which refers to the air pressure in terms of altitude in the International Standard Atmosphere. The altitude data may comprise data regarding density altitude, which refers to the density of the air in terms of altitude in the International Standard Atmosphere in the air. The Mach data may comprise data regarding Mach number, which refers to the ratio of flow velocity past a boundary to the local speed of sound. The air data obtained may vary depending on practical implementations.

The one or more air data inputs are provided from one or more air data sources. The one or more air data sources may comprise one or more measuring devices, where each measuring device comprises one or more sensors. The one or more sensors may be located at various locations. For example, the one or more sensors may be located on the airframe of the aircraft. Accordingly, the air data may be obtained from the airframe of the aircraft. The one or more air data sources may comprise an air data computer or aircraft/engine computer. The one or more air data sources may comprise any other suitable air data source. The one or more air data sources may comprise an air temperature data source for providing air temperature data, a pressure data source for providing pressure data, an altitude data source for providing altitude data, an airspeed data source for providing airspeed data, a Mach data source from providing Mach data and/or any other suitable data source. Each air data source may provide a separate air data input or a specific data source may provide multiple air data inputs, or a combination thereof. The sources that the air data is provided from may vary depending on practical implementations. The air data may be dynamically obtained in real time, or may be recorded regularly in accordance with any suitable time interval. Step 204 may comprise triggering an action to obtain the air data whenever method 200 is initiated. The air data may be referred to as airframe data.

The air data inputs may vary depending on practical application. For example, an air temperature data input may provide air temperature data, a pressure data input may provide pressure data, an altitude data input may provide altitude data, an airspeed data input may provide airspeed data, and/or a Mach data input may provide Mach data. Other air data inputs are contemplated. In accordance with a specific and non-limiting example of implementation, air data is obtained from one or more of an air temperature data input for providing air temperature data, an altitude data input for providing the altitude data of the aircraft and a Mach data input for providing the Mach data of the aircraft.

At step 206, from the air data, it is detected if the air temperature data input is compromised. The air temperature data input is compromised if the air temperature data input is providing erroneous data or if the air temperature data input is missing (i.e., not providing data). Accordingly, the air data may be monitored to determine if a specific air data input is compromised. The air data may be monitored either dynamically in real time when needed, regularly in accordance with any predetermined time interval, or any irregular time interval.

In accordance with a specific and non-limiting example of implementation, air data is monitored to detect if one or more of an air temperature data input, an altitude data input and a Mach data input is compromised. The air data monitored for detecting if a specific air data input is compromised may vary depending on practical implementation. In some embodiments, detecting at least one compromised air data input comprises determining that at least one compromised air data input is missing. For instance, the air data may be monitored to determine if the air data is missing data relating to a specific data input. By way of example, the air data may be monitored to determine if the air data is missing one or more of the air temperature data input, the altitude data input and the Mach data input. Similarly, in some embodiments, detecting the at least one compromised air data input comprises determining that at least one compromised air data input is providing erroneous data. The air data may be monitored to determine if the air data input is providing erroneous data relating to a specific data input. For example, the air data may be monitored to determine if the air data is erroneous for one or more of the air temperature data input, the altitude data input and the Mach data input.

At step 208, in some embodiments, in response to detecting the at least one compromised air data input (e.g., the air temperature data input), an acceleration reference or a deceleration reference of the engine 10 is reduced. The acceleration reference or the deceleration reference of the engine 10 may be reduced by a set amount, such as by 5%, 10%, 15%, 20%, 25%, 30% or 35%. Other amounts of fixed and variable reduction are contemplated. For example, the set amount may be applied to acceleration/deceleration schedules to reduce acceleration/deceleration schedules by the set amount. The acceleration/deceleration reference may be continuously calculated and dependent on various operational factors. Overthrust protection may be accomplished by establishing a maximum target engine rotational speed and reducing the acceleration reference or the deceleration reference by the set amount to mitigate any engine operability concerns such as surge or stall.

At step 210, in response to detecting that the air temperature data input is compromised, a target engine rotational speed is determined based on the position of the thrust lever and at least one of altitude data and Mach number data obtained from the air data. The target engine rotational speed refers to a desired rotational speed for the engine 10. In some embodiments, the target engine rotational speed is a target rotational speed (N1) for the low pressure engine spool.

The target engine rotational speed is determined based on the position of the thrust lever as a function of at least some of the air data. When at least one of the air data inputs is compromised, the air data is either missing from one or more air data inputs or is erroneous. Accordingly, air data from one or more of the non-compromised air data inputs may be used in determining the target engine rotational speed. In other words, when a specific air data input is compromised, the target engine rotational speed may be determined based on the position of the thrust lever and air data from one or more non-compromised air data inputs. A non-compromised air data input refers to an air data input that is neither missing nor providing erroneous data.

For example, when the air temperature data input is compromised, the target engine rotational speed may be determined based on the position of the thrust lever and both altitude data and Mach data. By way of another example, when the air temperature data input and the altitude data input are compromised, the target engine rotational speed may be determined based on the position of the thrust lever and Mach data. By way of yet another example, when the air temperature data input and the Mach data input are compromised, the target engine rotational speed may be determined based on the position of the thrust lever and altitude data. The target engine rotational speed may be determined in various manners depending on practical implementation.

The target engine rotational speed may be determined directly from the position of the thrust lever. For example, the target engine rotational speed may be determined from a schedule, a look-up table, a mapping, an equation, and/or any other suitable technique that uses the position of the thrust lever to determine the target engine rotational speed. In some embodiments, in response to detecting at least one compromised air data input, a schedule, a look-up table, a mapping, or an equation is selected based on the air data. The selected schedule, look-up table, mapping, or equation is then used to determine the target engine rotational speed from the position of the thrust lever. In accordance with a specific and non-limiting example of implementation, when the air temperature data input is compromised, the altitude data and Mach data may be used to select a schedule, and the target engine rotational speed is determined from the selected schedule based on the position of the thrust lever. By way of another example, when the air temperature data input and the Mach data input are compromised, the altitude data may be used to select a schedule, and the target engine rotational speed is determined from the selected schedule based on the position of the thrust lever. By way of yet another example, when the air temperature data input and the altitude data input are compromised, the Mach data may be used to select a schedule, and the target engine rotational speed is determined from the selected schedule based on the position of the thrust lever. Accordingly, the target engine rotational speed may be determined directly from the position of the thrust lever as a function of air data from one or more non-compromised air data inputs. By determining the target engine rotational speed from a direct relationship with the position of the thrust lever, this may allow for less dependency on other inputs required for power settings, for example, inlet temperature probes.

It should be appreciated that at step 210, the target engine rotational speed is determined without the use of thrust rating schedules, as conventionally done. In other words, the target engine rotational speed is determined without the use of a thrust rating mode, for example, such as max takeoff (MTO), climb (CLB), cruise (CR), flight idle, ground idle, reverse idle and max reverse thrust (MRT). It should further be appreciated that at step 210, the target engine rotational speed is determined without the use of bleed data, as conventionally done.

At step 212, in some embodiments, the position of the thrust lever is monitored to determine if the thrust lever has moved by a set amount. The set amount may be any suitable value, such as 1 degree, 2 degrees or 3 degrees. Other values for the set amount are contemplated, depending on the engine configuration and/or characteristics. If the thrust lever is increased by the set amount and the target engine rotational speed is greater than or equal to a currently held engine rotational speed, then the method proceeds to step 214. Similarly, if the thrust lever is decreased by the set amount and the target engine rotational speed is less than or equal to the currently held engine rotational speed, then the method proceeds to step 214. If the thrust lever has not been moved by the set amount, then the thrust of the engine 10 is maintained at a current engine rotational speed of the engine 10. In such case, method 200 waits for the thrust lever to be moved by the set amount before proceeding to step 214.

At step 214, a thrust of the engine 10 is controlled based on the target engine rotational speed. Controlling thrust of the engine 10 comprises adjusting the rotational speed of the engine 10 to the target engine rotational speed. For example, the rotational speed of the low pressure engine spool may be set at the target engine rotational speed. In some embodiments, a rate limiter is used in adjusting the engine rotational speed to the target engine rotational speed. The rate limiter results in the engine rotational speed being adjusted from the current engine rotational speed to the target engine rotational speed in a gradual manner. The rate limiter may be implemented as limiting schedules to prevent undesired engine operation. For example, if the desired change in speed is small (e.g. below a predetermined threshold), the rotational speed may be changed without invoking the rate limiter. In accordance with an embodiment, adjusting the rotational speed of the engine 10 to control thrust of the engine 10 comprises outputting one or more commands to the engine 10 for adjusting the rotational speed of the engine 10 to the target engine rotational speed.

When thrust of the engine 10 is controlled at step 214 based on the target engine rotational speed as determined at step 210, this may be referred to as the alternate thrust control (ATC) mode.

It should be appreciated that by waiting for the thrust lever to be moved by the set amount (step 212), prior to controlling thrust of the engine 10 (step 214), this allows for a thrust bump to be prevented from occurring when the thrust lever is in a fixed position. A delay may occur before the thrust of the engine 10 is controlled based on the target engine rotational speed (step 214). Similarly, a delay may occur when thrust control of the engine 10 transitions out of the ATC mode into a thrust rating based mode. As such, this allows for a smoother or bumpless transition into and/or out of the ATC mode. It should further be appreciated that the function provided by step 212 protects against thrust inversion when transitioning between thrust setting modes by holding engine rotational speed constant if a forward movement of the thrust lever would result in a thrust decrease; likewise, if a reverse movement of the thrust lever results in a thrust increase, the engine rotational speed is also held. Then when the currently held engine rotational speed becomes equivalent to the target rotational speed, for example as set out in a selected schedule, the schedule may be followed.

Figure 2B:
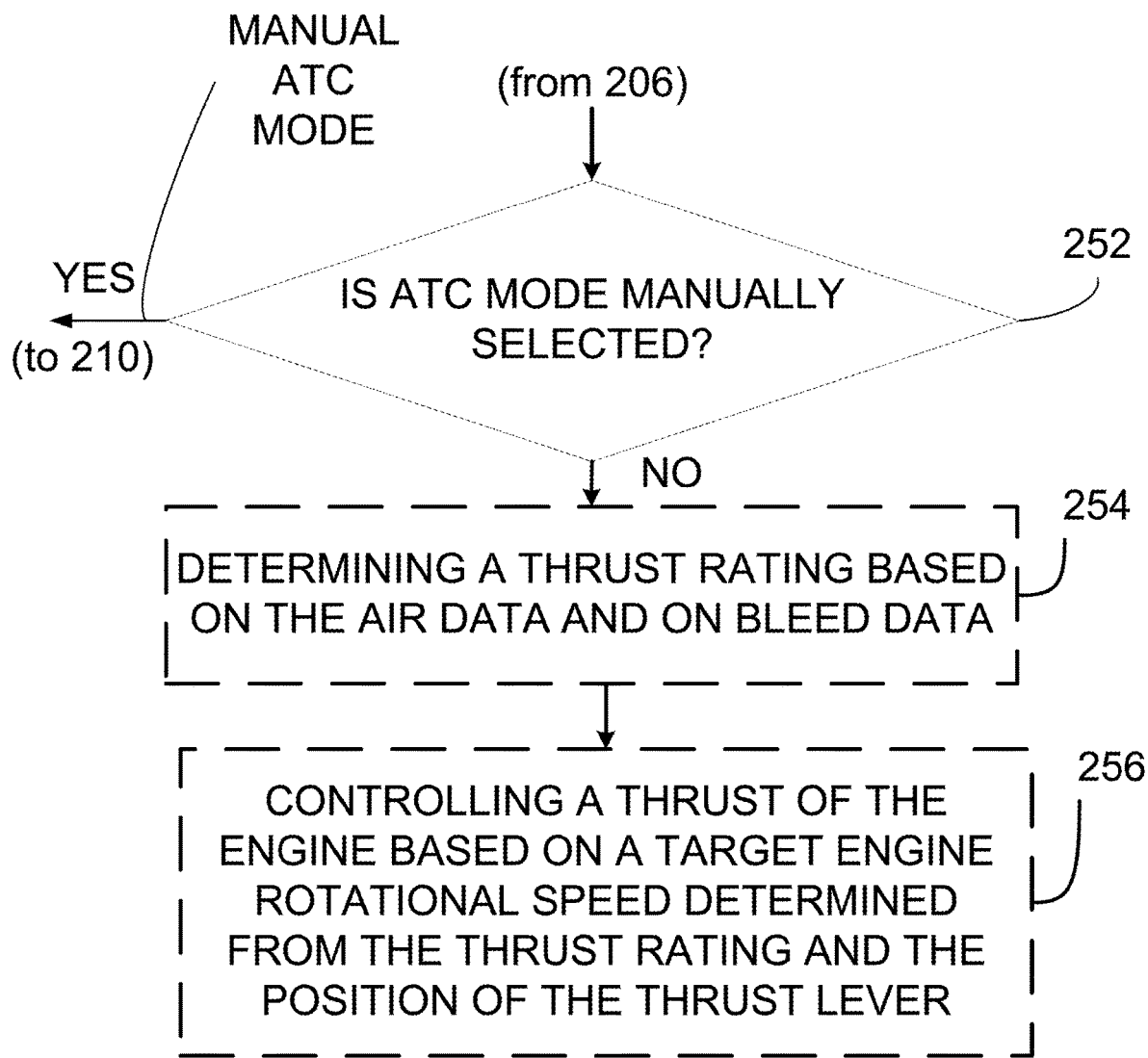
FIG. 2B is a flowchart further illustrating the example method for controlling thrust of the engine in accordance with an embodiment.

With additional reference to FIG. 2B, at step 206, if the air temperature data input is not detected as being compromised, then the method 200 may optionally proceed to step 252. At step 252, in some embodiments, it is detected if the ATC mode is manually selected. The ATC mode may be manually selected by pilot action such as actuation of a switch, a button or any other suitable mechanism. For example, when a first engine is automatically set into ATC mode based on the detection of the air temperature data input being compromised, the pilot may want to manually set the second engine into the ATC mode. In other words, each engine on a multi-engine installation can be operated independently in ATC mode allowing the crew to manually match the target engine rotational speeds between engines as appropriate. In response to detecting that the ATC mode is selected, then method 200 optionally proceeds to step 210. In this case, the acceleration/deceleration reference reduction of step 208 is bypassed. In other words, the same acceleration/deceleration rates are used without a reduction when the ATC mode is manually selected. If the ATC mode is not manually selected, then the method 200 optionally proceeds to step 254. Accordingly, the ATC mode when engaged by manual selection may be referred to as manual ATC mode and the ATC mode when automatically engaged by detecting that the air temperature data input is compromised may be referred to as automatic ATC mode.

At step 254, in some embodiments, a thrust rating for the engine 10 is determined based on the air data and on bleed data. The thrust rating may be max takeoff (MTO), climb (CLB), cruise (CR), flight idle, ground idle, reverse idle or max reverse thrust (MRT). In some embodiments, a thrust uptrim is utilized when one engine is inoperative (OEI) and may be referred to as an OEI rating. The bleed data may be obtained in a similar manner as the air data, for example by use of sensor(s), measurement device(s) and/or or aircraft/engine computer. The bleed data refers to data indicating use of air from the engine 10 for other aircraft systems, such as to pressurize the cabin and/or to mitigate ice build-up. At step 256, in some embodiments, the target engine rotational speed is determined from the thrust rating and the position of the thrust lever; and the thrust of the engine 10 is controlled based on the target engine rotational speed as determined from the thrust rating and the position of the thrust lever. It should be appreciated that steps 254 and 256 illustrate the thrust rating based mode, in a conventional manner.

With reference to FIG. 3, the method 200 may be implemented by a computing device 300, comprising a processing unit 302 and a memory 304 which has stored therein computer-executable instructions 306. The processing unit 302 may comprise any suitable devices configured to implement the system such that instructions 306, when executed by the computing device 300 or other programmable apparatus, may cause the functions/acts/steps of the method 200 as described herein to be executed. The processing unit 302 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 304 may comprise any suitable known or other machine-readable storage medium. The memory 304 may comprise non-transitory computer readable storage medium, for example, but not limited to, an electronic, magnetic, optical, electromagnetic, infrared, or semiconductor system, apparatus, or device, or any suitable combination of the foregoing. The memory 304 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may comprise any storage means (e.g., devices) suitable for retrievably storing machine-readable instructions 306 executable by processing unit 302. In some embodiments, the computing device 300 can be implemented as part of a full-authority digital engine controls (FADEC) or other similar device, including electronic engine control (EEC), engine control unit (EUC), and the like.

The methods and systems for controlling thrust of an engine described herein may be implemented in a high level procedural or object oriented programming or scripting language, or a combination thereof, to communicate with or assist in the operation of a computer system, for example the computing device 300. Alternatively, the methods and systems for controlling thrust of an engine may be implemented in assembly or machine language. The language may be a compiled or interpreted language. Program code for implementing the methods and systems for controlling thrust of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Embodiments of the methods and systems for controlling thrust of an engine may also be considered to be implemented by way of a non-transitory computer-readable storage medium having a computer program stored thereon. The computer program may comprise computer-readable instructions which cause a computer, or in some embodiments the processing unit 302 of the computing device 300, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 4:
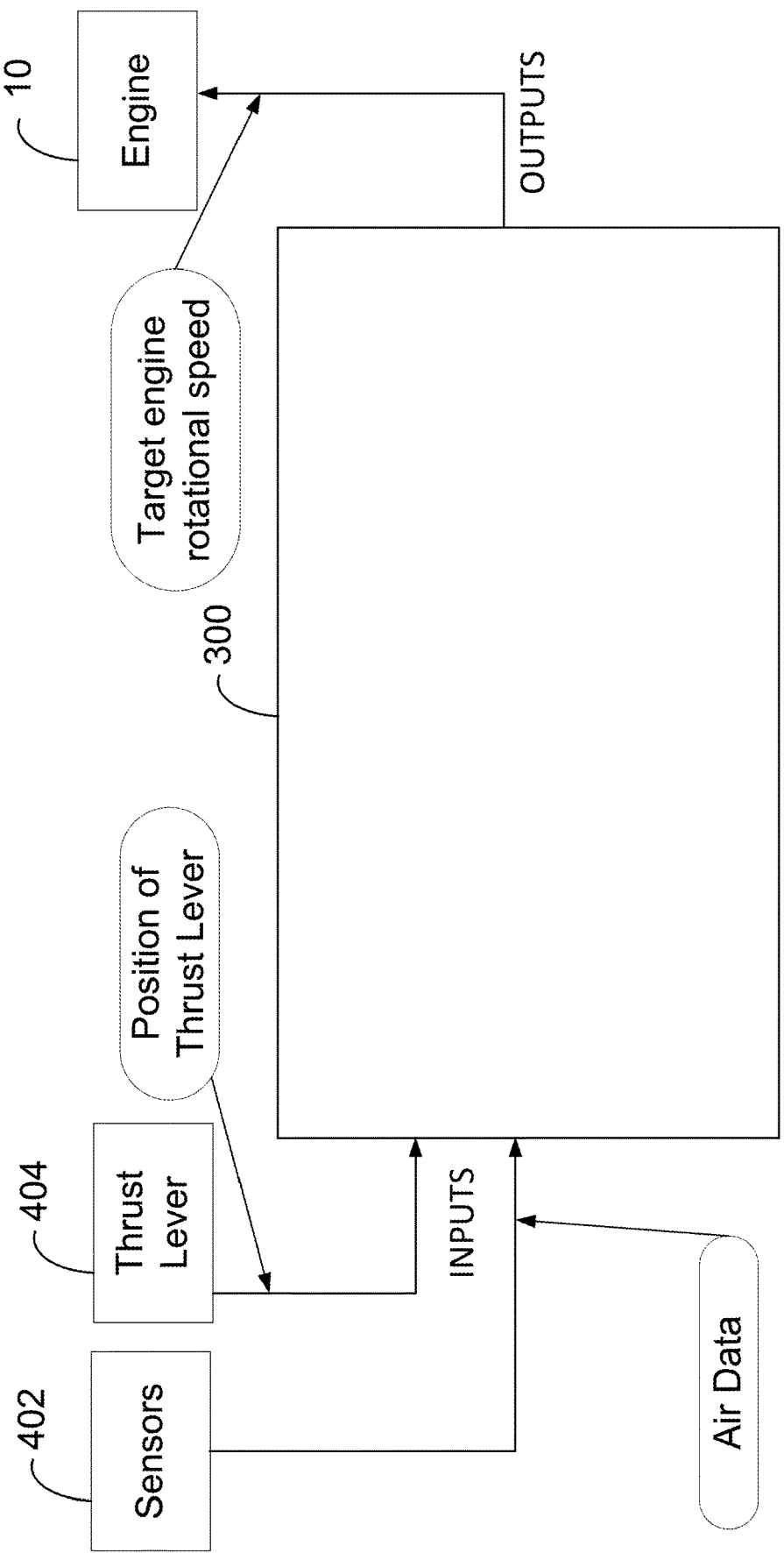
FIG. 4 is a block diagram of sensors and a thrust lever respectively providing air data and a position of the thrust lever as inputs to the example computing system configured for controlling thrust of the engine in accordance with an embodiment.

With reference to FIG. 4, a block diagram illustrates the computing device 300 and the engine 10, in accordance with an embodiment. In the illustrated embodiment, sensors 402 are used to measure the air data. The sensors 402 may comprise one or more of a temperature sensor, pressure sensor, speed sensor, altitude sensor and/or any other suitable sensor. In the embodiment illustrated in FIG. 4, the inputs to the computing device 300 are the air data and a position of a thrust lever 404 and the output of computing device 300 is the engine rotational speed being set at the target engine rotational speed.

Figure 5:
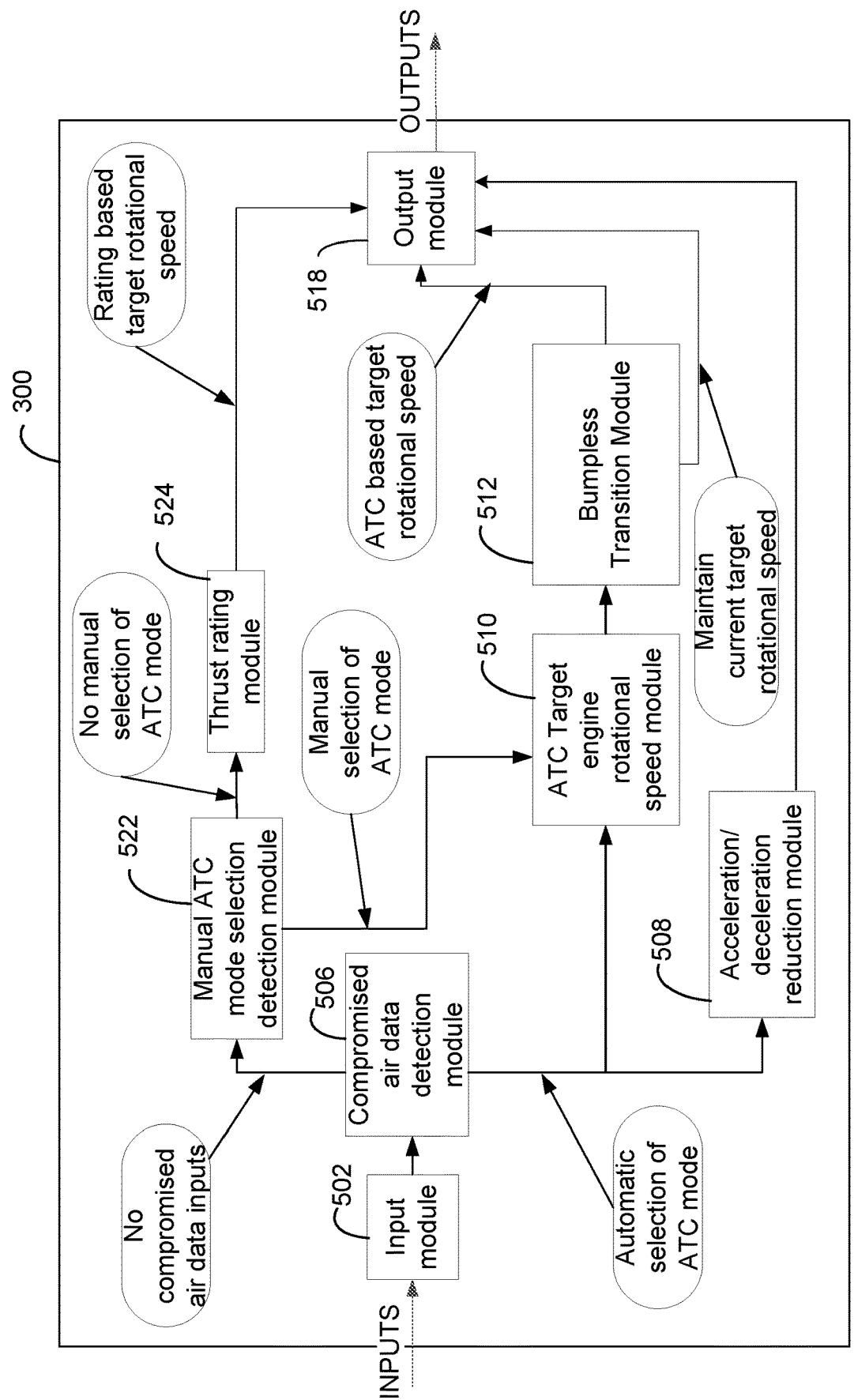
FIG. 5 is a detailed block diagram of the computing system in accordance with an embodiment.

With additional reference to FIG. 5, the computing device 300 may implement various modules 502, 506, 508, 510, 512, 518, 522 and/or 524. An input module 502 receives the air data and the position of the thrust lever. A compromised air data detection module 506 determines if the air temperature data input is compromised, according to step 206 of method 200. If the air temperature data input is compromised, then an acceleration/deceleration reduction module 508 reduces the acceleration/deceleration reference of the engine 10, according to step 208 of method 200. An ATC target engine rotational speed module 510 determines the target engine rotational speed, according to step 210 of method 200. A bumpless transition module 512 monitors the thrust lever position to see if the thrust lever has moved by the set amount, according to step 212 of method 200. If the thrust lever has not been moved by the set amount, then the current rotational speed of the engine 10 is maintained. If the thrust lever is increased by the set amount and the target engine rotational speed is greater than or equal to the currently held engine rotational speed, then thrust of the engine 10 is controlled based on the target engine rotational speed. Similarly, if the thrust lever is decreased by the set amount and the target engine rotational speed is less than or equal to currently held engine rotational speed, then thrust of the engine 10 is controlled based on the target engine rotational speed. The thrust of the engine 10 is controlled based on the target engine rotational speed by the output module 518, according to step 214 of method 200. The output module 518 can output one or more commands from the computing device 300 to the engine 10 to control thrust. In accordance with an embodiment, the output module 518 outputs a command to adjust the rotational speed of the engine 10 to the target engine rotational speed. One or more actuators of the engine 10 may accordingly adjust the rotational speed of the engine based on the command.

At the compromised air data detection module 506, if no air data inputs are compromised, then a manual ATC mode selection detection module 522 determines if the ATC mode is manually selected, according to step 252 of method 200.

If the ATC mode is manually selected, then the target engine rotational speed module 510 is used for determining the target engine rotational speed. As illustrated, acceleration/deceleration reference reduction module 508 is bypassed when the ATC mode is manually selected. If the ATC mode is not manually selected, then at a thrust rating module 524, a thrust rating for the engine 10 is determined based on the air data and bleed data, according to step 254 of method 200. The thrust of the engine 10 is controlled based on the target engine rotational speed determined from the thrust rating and the position of the thrust lever by the output module 518, according to step 256 of method 200.

In some embodiments, where there is loss of all the air data inputs, the target engine rotational speed may be determined based on the position of the thrust lever based on the selection of constant default values. Then, engine modulation between idle and the N1 redline is maintained with these default values. However, the engine 10 may be more prone to surge and/or stall due to the use of the default values during speed transition.

In some embodiments, transition into and out of the ATC mode may be automatically performed at low thrust levels without any pilot interaction of moving the thrust lever as described at step 212. Low thrust levels may be defined by a low thrust range from the idle regime of the thrust lever to a specific value (e.g., +2, +3, +4 degrees and/or any other suitable value) of the thrust lever. While in the low thrust range, the transition into controlling thrust at step 214 based on the target engine rotational speed determined at step 210 may be immediate without application of step 212. In accordance with a specific and non-limiting example of implementation, the low thrust range is between the idle regime of the thrust lever and +3 degrees of the thrust lever. In some embodiments, during the transition into or out of the ATC mode (automatic and/or manual), the change in engine rotational speed may be rate limited while a difference between the target speed and the actual speed exceeds a speed difference threshold. For example, changes in engine rotational speed may be rate limited until the difference between the target speed and actual speed is less than 3% of the engine rotational speed; when the difference is less than 3% of the engine rotational speed, the rate limit is removed. Accordingly, in some embodiments, the speed difference threshold may be set to 3% of the engine rotational speed. The rate limit may be different if the transition is occurring outside of a low thrust range (i.e., a high thrust range). For example, in the low thrust range the rate limit may be set to 1.27% N1/s and above the low thrust range the rate limit may be set to 3% N1/s, whether increasing or decreasing in speed. In some embodiments, at higher levels of thrust outside of the low thrust range, the pilot manually moves the thrust lever to activate application of the ATC mode for controlling thrust of the engine (step 214) based on the determined target engine rotational speed (step 210). In some embodiments, when there is a larger thrust lever movement greater than a second movement range (e.g., greater than ±2, ±3, ±5 degrees and/or any other suitable value), the transition to the active application of the ATC mode occurs substantially instantaneously.

In one embodiment, the ATC mode may be more robust against thrust inventions with thrust lever movement, for example, as described elsewhere in this document in relation to the bumpless transition and/or thrust inversion.

In one embodiment, the ATC mode allows for operation in the reverse thrust region.

In one embodiment, the ATC mode provides schedules to provide thrust within a N1 redline and a maximum rated thrust of the engine 10.

In one embodiment, the ATC mode may allow for increased dispatch availability for the aircraft by allowing the operator to continue flight and land the aircraft using the ATC mode.

It should be appreciated that the ATC mode may not require additional engine sensors which may result in a weight and/or reliability improvement.

It should also be appreciated that the ATC mode may provide fine control over thrust response to thrust lever movements compared to using a conventional thrust rating schedule by using only mach number and altitude for determining the thrust rating schedule.

It should further be appreciated that, in one embodiment, the ATC mode allows for thrust of the engine 10 to be modulated by a direct relationship between the thrust lever position and the target engine rotational speed rather than based on the thrust lever position and thrust rating as typically done.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling thrust of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method of controlling thrust of an engine for an aircraft, the method comprising:
    obtaining, at a computing device, a position of a thrust lever for controlling the engine from one or more sensors;
    obtaining, at the computing device, air data from one or more air data inputs;
    detecting, at the computing device, from the air data if an air temperature data input is compromised;
    in response to detecting that the air temperature data input is compromised, determining, at the computing device, a target engine rotational speed based on the position of the thrust lever and at least one of altitude data and Mach number data obtained from the air data; and
    adjusting, by the computing device, a rotational speed of the engine to the target engine rotational speed to control thrust of the engine.

2. The method of claim 1, wherein detecting that the air temperature data input is compromised comprises determining that the air temperature data input is missing.

3. The method of claim 1, wherein detecting that the air temperature data input is compromised comprises determining that the air temperature data input is providing erroneous data.

4. The method of claim 1, further comprising selecting a schedule based on at least one of altitude data and Mach number data from the air data and wherein determining the target engine rotational speed comprises determining the target engine rotational speed from the schedule using the position of the thrust lever.

5. The method of claim 1, further comprising reducing an acceleration reference or a deceleration reference of the engine, in response to detecting the air temperature data input is compromised.

6. The method of claim 1, further comprising:
    detecting if an alternative thrust control mode is selected; and
    in response to detecting that the alternative thrust control mode is selected, determining the target engine rotational speed based on the position of the thrust lever and the at least one of altitude data and Mach number data.

7. The method of claim 1, further comprising waiting for the position of the thrust lever to be increased by a set amount and determining that the target engine rotational speed is greater than or equal to a currently held engine rotational speed before adjusting the rotational speed of the engine to the target engine rotational speed to control thrust of the engine.

8. The method of claim 1, further comprising waiting for the position of the thrust lever to be decreased by a set amount and determining that the target engine rotational speed is less than or equal to a currently held engine rotational speed before adjusting the rotational speed of the engine to the target engine rotational speed to control thrust of the engine.

9. The method of claim 1, wherein the target engine rotational speed is a target rotational speed of a low pressure engine spool.

10. A system for controlling thrust of an engine for an aircraft, the system comprising:
    at least one processing unit; and
    a non-transitory computer-readable memory having stored thereon program instructions executable by the at least one processing unit for:
        obtaining a position of a thrust lever for controlling the engine from one or more sensors;
        obtaining air data from one or more air data inputs;
        detecting from the air data if an air temperature data input is compromised;
        in response to detecting that the air temperature data input is compromised, determining a target engine rotational speed based on the position of the thrust lever and at least one of altitude data and Mach number data obtained from the air data; and
        adjusting a rotational speed of the engine to the target engine rotational speed to control thrust of the engine.

11. The system of claim 10, wherein detecting that the air temperature data input is compromised comprises determining that the air temperature data input is missing.

12. The system of claim 10, wherein detecting that the air temperature data input is compromised comprises determining that the air temperature data input is providing erroneous data.

13. The system of claim 10, wherein the program instructions are further executable by the processing unit for selecting a schedule based on at least one of altitude data and Mach number data from the air data and wherein determining the target engine rotational speed comprises determining the target engine rotational speed from the schedule using the position of the thrust lever.

14. The system of claim 10, wherein the program instructions are further executable by the processing unit for reducing an acceleration reference or a deceleration reference of the engine, in response to detecting the air temperature data input is compromised.

15. The system of claim 10, wherein the program instructions are further executable by the processing unit for:
detecting if an alternative thrust control mode is selected; and
in response to detecting that the alternative thrust control mode is selected, determining the target engine rotational speed based on the position of the thrust lever and the at least one of altitude data and Mach number data.

16. The system of claim 10, wherein the program instructions are further executable by the processing unit for waiting for the position of the thrust lever to be increased by a set amount and determining that the target engine rotational speed is greater than or equal to a currently held engine rotational speed before adjusting the rotational speed of the engine to the target engine rotational speed to control thrust of the engine.

17. The system of claim 10, wherein the program instructions are further executable by the processing unit for waiting for the position of the thrust lever to be decreased by a set amount and determining that the target engine rotational speed is less than or equal to a currently held engine rotational speed before adjusting the rotational speed of the engine to the target engine rotational speed to control thrust of the engine.

18. The system of claim 10, wherein the target engine rotational speed is a target rotational speed of a low pressure engine spool.

19. A computer readable medium having stored thereon program code executable by a processor for controlling thrust of an engine for an aircraft, the program code comprising instructions for:
obtaining a position of a thrust lever for controlling the engine from one or more sensors;
obtaining air data from one or more air data inputs;
detecting from the air data if an air temperature data input is compromised;
in response to detecting that the air temperature data input is compromised, determining a target engine rotational speed based on the position of the thrust lever and at least one of altitude data and Mach number data obtained from the air data; and
adjusting a rotational speed of the engine to the target engine rotational speed to control thrust of the engine.

20. The computer readable medium of claim 19, wherein the program code further comprising instructions for selecting a schedule based on at least one of altitude data and Mach number data from the air data and wherein determining the target engine rotational speed comprises determining the target engine rotational speed from the schedule using the position of the thrust lever.

* * * * *

UNITED STATES PATENT AND TRADEMARK OFFICE
CERTIFICATE OF CORRECTION

PATENT NO. : 10,946,972 B2  
APPLICATION NO. : 16/198721  
DATED : March 16, 2021  
INVENTOR(S) : Birch et al.

Page 1 of 1

It is certified that error appears in the above-identified patent and that said Letters Patent is hereby corrected as shown below:

On the Title Page

Item (72), add:  
Paul Earley, Savannah GA (US)

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*